United States Patent
Fraleigh et al.

(10) Patent No.: US 8,943,017 B2
(45) Date of Patent: Jan. 27, 2015

(54) METHOD AND DEVICE FOR REAL-TIME KNOWLEDGE PROCESSING BASED ON AN ONTOLOGY WITH TEMPORAL EXTENSIONS

(71) Applicants: Steven P. Fraleigh, North Andover, MA (US); Alan C. Perry, Concord, MA (US)

(72) Inventors: Steven P. Fraleigh, North Andover, MA (US); Alan C. Perry, Concord, MA (US)

(73) Assignee: Smartcloud, Inc., Bedford, MA (US)

( * ) Notice: Subject to any disclaimer, the term of this patent is extended or adjusted under 35 U.S.C. 154(b) by 0 days.

(21) Appl. No.: 14/260,150

(22) Filed: Apr. 23, 2014

(65) Prior Publication Data

US 2014/0317044 A1  Oct. 23, 2014

Related U.S. Application Data

(60) Provisional application No. 61/815,010, filed on Apr. 23, 2013.

(51) Int. Cl.
| | |
|---|---|
| *G06F 17/00* | (2006.01) |
| *G06N 7/00* | (2006.01) |
| *G06N 7/08* | (2006.01) |
| *G06N 5/02* | (2006.01) |

(52) U.S. Cl.
CPC ..................................... *G06N 5/022* (2013.01)
USPC .......................................................... 706/59

(58) Field of Classification Search
None
See application file for complete search history.

(56) References Cited

U.S. PATENT DOCUMENTS

| 2004/0122656 | A1* | 6/2004 | Abir .................................. 704/4 |
| 2005/0198622 | A1* | 9/2005 | Ahluwalia et al. ............ 717/130 |
| 2006/0184473 | A1* | 8/2006 | Eder ................................ 706/20 |
| 2011/0035349 | A1* | 2/2011 | Kretz et al. ..................... 706/48 |
| 2011/0320187 | A1* | 12/2011 | Motik et al. ...................... 704/9 |
| 2012/0158633 | A1* | 6/2012 | Eder ................................ 706/46 |

OTHER PUBLICATIONS

"The 7th International Workshop on Scalable Semantic Web Knowledge Base Systems (SSWS 2011)" At the 10th International Semantic Web Conference (ISWC 2011), Bonn, Germany, Oct. 24, 2011 Achille Fokuoe Thorsten Liebig Yuanbo Guo.*

* cited by examiner

*Primary Examiner* — Kakali Chaki
*Assistant Examiner* — Luis Sitiriche
(74) *Attorney, Agent, or Firm* — Soquel Group LLC

(57) ABSTRACT

Embodiments are directed towards a method and a computer server for receiving assertions, wherein an assertion can have a functional property such that for a given subject and a given property the object has a single value at any time, maintaining a knowledge base that includes (1) a history table that stores previously received assertions, and (2) a snapshot table that stores currently valid assertions, maintaining a snapshot cache in memory that stores a subset of the assertions in the snapshot table, initiating a processing cycle, selecting an assertion for processing, generating an assertion tuple that corresponds to the selected assertion, determining that the property of the selected assertion is functional, writing a retraction tuple to the history table, writing the assertion tuple to the snapshot table; and writing the assertion tuple to the history table.

20 Claims, 8 Drawing Sheets

US 8,943,017 B2

METHOD AND DEVICE FOR REAL-TIME KNOWLEDGE PROCESSING BASED ON AN ONTOLOGY WITH TEMPORAL EXTENSIONS

REFERENCE TO RELATED APPLICATIONS

This application claims benefit of U.S. Provisional Application No. 61/815,010 entitled SMARTCLOUD, filed on Apr. 23, 2013 by inventors Steven P. Fraleigh and Alan C. Perry, which is hereby incorporated by reference.

TECHNICAL FIELD

Various embodiments generally relate to a method and system for real-time processing of knowledge data using an ontology representation of knowledge.

BACKGROUND

A number of technologies provide solutions for tracking and analysis of real-time streams of information from multiple sources across a network. Complex event processing (CEP) is a method of tracking and processing streams of data and inferring events or patterns.

The semantic web, an initiative of the Worldwide Web Consortium (W3C), standardizes a stack of software components that represent knowledge using a semantic web ontology. The ontology, named OWL, the most recent version being OWL 2, provides a language to represent relationships between entities. Additionally, the semantic web initiative has defined methods for representing complex interrelationships between entities on a network and communicating facts about the entities and relationships.

OWL is used to build knowledge through a series of declarative statements referred to as axioms. OWL relies on another W3C standard named Resource Description Framework (RDF) that provides a general method for conceptualizing the description or modeling of information, using a variety of syntax notations and data serialization formats. RDF standardizes the format for statements and uses a three part format referred to as triples in which a subject and object are related by a predicate, which may also be referred to as a property or relation.

A class of databases, referred to as a triple store, has emerged that natively stores RDF subject-predicate-object (SPO) triples.

While a number of real-time applications, such as industrial control, can be modeled using an OWL, or more generally an ontology, approach, these applications have a temporal component. That is, in order to construct a complete application time information must be associated with events. In such temporal applications axioms change from time-to-time and assertions, i.e. SPO values, may be updated frequently. Databases with built-in support for handling a temporal information associated with knowledge or data are known as temporal databases. A bitemporal database is a type of temporal database.

Therefore, it would be advantageous to combine the advantages of bitemporal databases with an ontology approach to enable the representation, storage, and processing of streams of data to provide a rich, hierarchical representation method that also supports temporal processing.

Applications such as industrial control are typically real-time applications in which information concerning a large number of real world objects, e.g. pumps or sensors, is updated frequently and the associated processing must keep up with the incoming data flow. In such applications there may be a high volume of assertions sent to a central control system that is monitoring or managing a plant or facility. For such applications it would be advantageous to combine the advantages of bitemporal databases and an ontology approach to modeling and storing knowledge and to optimize the real-time processing to rapidly process high volumes of incoming assertions.

Thus, it is with respect to these considerations and others that the present invention has been made.

SUMMARY OF THE DESCRIPTION

Various embodiments are directed towards a method for representing the external world in which agents, acting on behalf of real world entities such as industrial devices and processes, send messages that represent state and event information. The computer-implemented method receives the messages and stores corresponding facts, also referred to as assertions, using an ontology language as a knowledge base. The method is performed in real-time as a repeating cycle in which assertions are written sequentially to disk, snapshot and history tables are updated, and then the data is committed during a commit phase.

In certain embodiments, a method is implemented by a server, referred to as a real-time application platform (RTAP) server. The RTAP server receives messages which encode axioms, processes the axioms and commits data to a knowledge base. The knowledge base includes a history table which includes a row for assertion that has been processed, and a snapshot table for currently valid assertions. In certain embodiments, the RTAP server makes use of a cache, referred to as a snapshot cache, that enhances performance. The snapshot cache is updated during the commit phase to ensure consistent views of data.

Embodiments are directed towards a method and a computer server for receiving a plurality of assertions wherein an assertion comprises a subject, a property and an object and wherein an assertion can have a functional property such that for a given subject and a given property the object has a single value at any time, and if a new assertion is received with the given subject and the given property and a different object value then the newly received assertion is valid and any previously received assertions are no longer valid, maintaining a knowledge base that includes (1) a history table that stores previously received assertions, and (2) a snapshot table that stores currently valid assertions, maintaining a snapshot cache in memory that stores a subset of the assertions in the snapshot table, initiating a processing cycle, which is a period of time during which the received plurality of assertions is processed, selecting an assertion for processing, generating an assertion tuple that corresponds to the selected assertion, wherein the assertion tuple includes the subject, property and object of the selected assertion, a transaction time, which is the starting time of the cycle, and a certainty value set to true, indicating that the selected assertion is true as of the transaction time, determining that the property of the selected assertion is functional, writing a retraction tuple to the history table that indicates that a previous assertion with the same subject and property as the selected assertion is retracted, wherein the certainty value of the retraction tuple is set to false, writing the assertion tuple to the snapshot table, and writing the assertion tuple to the history table.

BRIEF DESCRIPTION OF THE DRAWINGS

Non-limiting and non-exhaustive embodiments of the present invention are described with reference to the following drawings. In the drawings, like reference numerals refer to like parts throughout the various figures unless otherwise specified.

For a better understanding of the present invention, reference will be made to the following Detailed Description of the Preferred Embodiment, which is to be read in association with the accompanying drawings, wherein.

DETAILED DESCRIPTION

The invention now will be described more fully hereinafter with reference to the accompanying drawings, which form a part hereof, and which show, by way of illustration, specific exemplary embodiments by which the invention may be practiced. This invention may, however, be embodied in many different forms and should not be construed as limited to the embodiments set forth herein; rather, these embodiments are provided so that this disclosure will be thorough and complete, and will fully convey the scope of the invention to those skilled in the art. Among other things, the invention may be embodied as methods, processes, systems, business methods or devices. Accordingly, the present invention may take the form of an entirely hardware embodiment, an entirely software embodiment or an embodiment combining software and hardware aspects. The following detailed description is, therefore, not to be taken in a limiting sense.

As used herein the following terms have the meanings given below:

Ontology—refers to a set of descriptive statements about some part of the world (usually referred to as a domain of interest or a domain). In certain embodiments, the statements describe a hierarchical structure of entities and relationships between entities. In certain embodiments, the OWL standard is used.

Real-time processing—refers to a system that is designed to process a stream of incoming data without disregarding important data elements. Essentially, as used herein real-time processing refers to dividing time into a sequence of segments and processing all incoming requests during each cycle.

Fact—refers to a declarative statement that is stored in a knowledge base for processing. In certain embodiments, a fact refers to a type of axiom in the OWL language, typically an assertion referred to as an axiom or assertion.

Agent—refers to a software process that acts for a user or other entity. In certain embodiments agents act on behalf of an entity by sending messages that include facts such as axioms or assertions.

Generalized Operation

The operation of certain aspects of the invention is described below with respect to FIGS. 1-8.

Figure 1:
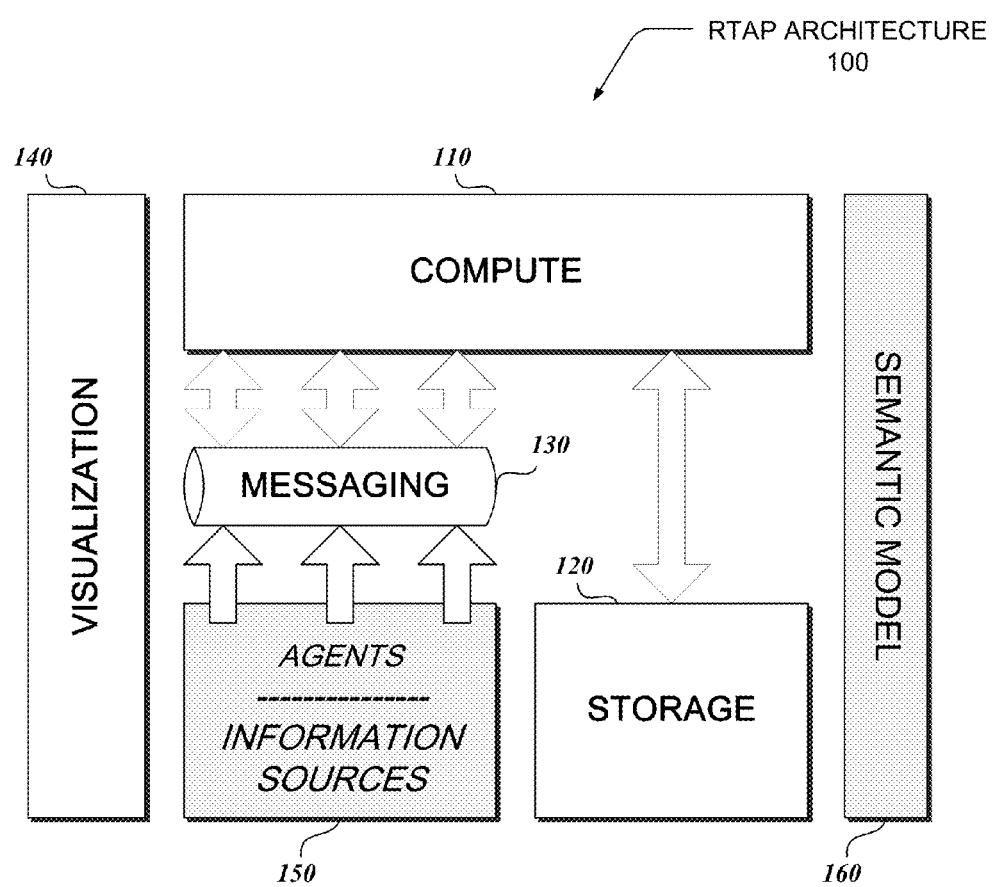
FIG. 1 is a generalized block diagram that shows the architecture 100 of a real-time, networked, computing system referred to as a RTAP system.

FIG. 1 is a generalized block diagram that shows the architecture 100 of a real-time application platform, referred to as RTAP. RTAP architecture 100 includes four fabrics, or processes: a compute fabric 110, a storage fabric 120, a messaging fabric 130 and a visualization fabric 140. Information sources 150 of various types include agents, or are represented by agents, that send messages using messaging fabric 130. Compute fabric 110 processes incoming messages and performs processing as well as data storage and query processing. In one embodiment, compute fabric stores data into a knowledge base that is managed by storage fabric 120. RTAP architecture 100 uses a semantic model to represent knowledge stores in the knowledge base. In one embodiment, as described hereinbelow, the semantic model is an ontology representation of knowledge.

In certain embodiments, RTAP architecture 100 uses an ontology representation of knowledge such as the OWL 2 knowledge representation language to provide classes, properties, individuals, and data values. OWL 2 ontologies can be used along with information written in RDF, and OWL 2 ontologies themselves are primarily exchanged as RDF documents. Both OWL 2 and RDF are standards of the World Wide Web Consortium (W3C). Information about OWL 2 and RDF can be found at the W3C website www.w3.org. As is discussed hereinbelow, the subject invention augments the OWL 2 language to incorporate temporal information.

Figure 2:
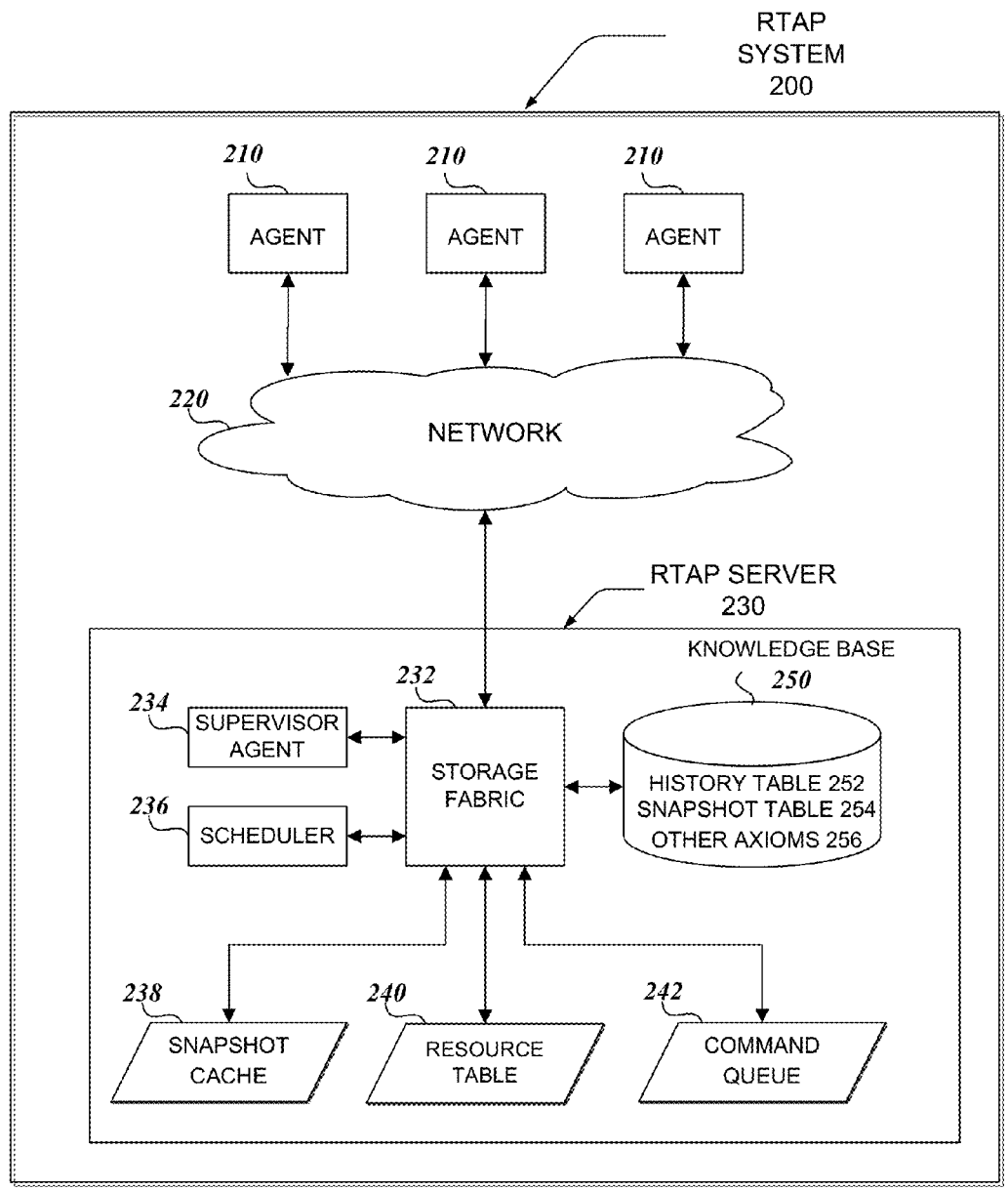
FIG. 2 is a generalized block diagram of an embodiment of a real-time processing system in which one or more agents send messages across a network to a RTAP server, which in turn stores axioms in a knowledge base for subsequent processing.

FIG. 2 is a generalized block diagram of an embodiment of a real-time processing system 200 in which one or more agents 210 send messages that include axioms across a network 220 to a RTAP server 230, which in turn stores axioms in a knowledge base 250 for subsequent processing. In one embodiment, RTAP server 230 includes components including a storage fabric 232, a supervisor agent 234, a scheduler 236, a snapshot cache 238, a resource table 240, a command queue 242 and a knowledge base 250. In certain embodiments network 220 is the World Wide Web (Web) or the Internet.

The subject invention focuses on the processing performed by RTAP storage fabric 232, which receives messages and then generates, queues and processes corresponding commands that are placed in command queue 242. Commands other than axioms can be placed in the command queue 242 such as a Flush command and various query commands, as discussed hereinbelow. The subject invention also covers processing associated with snapshot cache 238 that is used to substantially enhance performance.

As previously mentioned, RTAP server 230 uses an ontology representation of knowledge and processes and stores knowledge in knowledge base 250 as declarative statements, or facts. The term, axiom, taken from OWL, is used herein to refer to declarative statements that are then stored in a database or knowledge base such as knowledge base 250. While the formalisms provided by OWL, RDF and XML are convenient for working with Web-based knowledge applications, and are used herein, it will be appreciated by one of ordinary skill in the art that other types of knowledge representation, including ontology formalisms other than OWL and RDF, can be used alternatively within the spirit and scope of the subject invention.

As used herein, declarative statements, or assertions, which are a type of axiom, are received by RTAP server 230 from agents 210. An assertion relates entities by property relationships or expressions. The term "entity" or "individual", in this context, typically refers to real world objects such as people, places and things. Assertions are of the form SPO where S=subject, P=predicate or property relationship, and O=object. Underlying data is typically represented using the XML language. While the subject invention receives and processes a variety of axioms, this discussion is predominantly limited to the real-time processing of assertions which in the target class of applications comprise the overwhelming majority of axioms that are received by RTAP server 230 from agents 210, as discussed hereinbelow.

Generally, the term snapshot is used to refer to a valid assertion, i.e. an assertion that has not been superseded by a more recently received assertion. In one embodiment, knowledge base 250 includes a snapshot table 254 that includes a row for each assertion that has been received and is currently valid. Essentially snapshot table 254 show the current state of all assertions. Snapshot cache 238 is an in-memory version of snapshot table 254 that includes a subset of the assertions represented in snapshot table 254. For example, if RTAP server 230 is hafted suddenly then snapshot cache 238 may be erased; then, upon restart incoming assertions will cause snapshot cache 238 to be rebuilt. Thus, at any time, snapshot cache 238 may not include each of the assertions stored on disk in snapshot table 254.

New or incoming assertions are written to history table 252. History table 252 thus contains a time series of all assertions, including assertions that have been superseded and are no longer valid. Thus, history table 252 may be used to process history queries. A history query retrieves a series of assertions extending over a time range (a time series), rather than a single assertion representing the current, or "now-relative", snapshot value.

Knowledge base 250 also stores axioms other than assertions, referred to simply as other axioms 256.

Although not depicted in FIG. 2 or otherwise discussed herein, knowledge base 250 can import axioms, i.e. ontologies, from external systems that follow the OWL and RDF W3C standards.

Figure 3A:
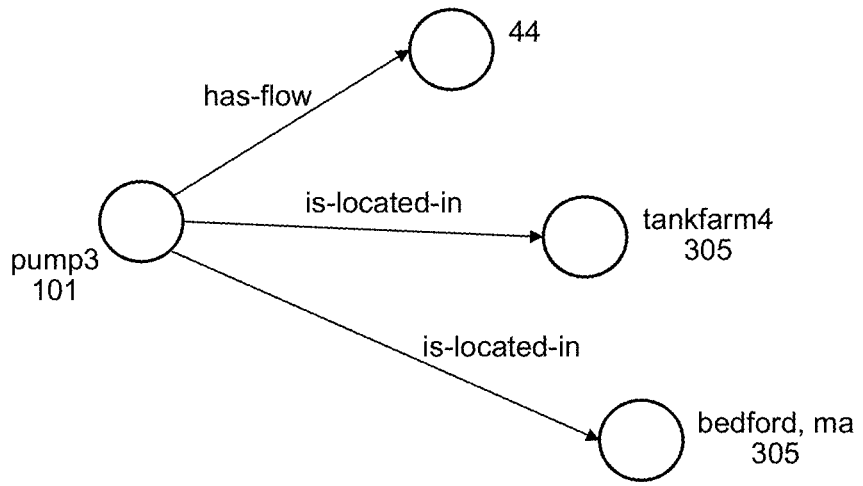
FIGS. 3A-B provide diagrammatic examples of several related axioms that may be processed by the RTAP system.
Figure 3B:
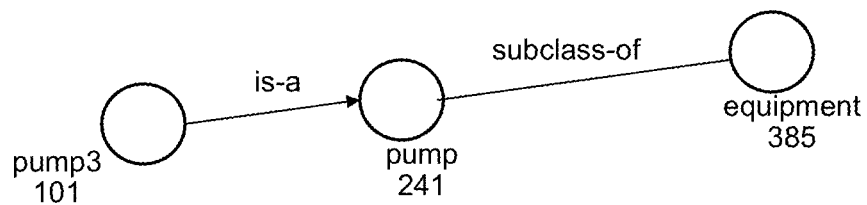

FIGS. 3A-B provide diagrammatic examples of several related assertions that may be processed by RTAP system 200. In FIG. 3A, pump3, an instance of a water pump, is a subject, has-flow is a property and 42 is a data value. This assertion expresses that pump3 has a water flow of 44 cubic feet per second (cfs). This can be expressed in OWL 2 syntax as a Data Property Assertion, a type of assertion that can be used to characterize an individual with a data value, as follows:
DataPropertyAssertion (:has-flow :pump3 "44":integer)

Another type of assertion is an object property assertion (OPA) that is used to state that an individual is connected by an object property expression (a type of property) to an individual. For example one object property assertion is: ObjectPropertyAsssertion (:hasbrother :Fred :Bob) which states that Fred has a brother named Bob.

Generally, names in OWL are international resource identifiers (IRIs). As IRIs can be quite long, in certain embodiments string values of subjects, properties and objects are assigned unique integer identifiers. For example, in the example of FIG. 3A. pump3 has an integer identifier of 101, tankfarm4 has the integer value of 305 and the string 442 is a data value with an integer value of 442. These are stored in resource table 240 as follows:

TABLE 1

Example Resource Table 240

| Name/Resource | Identifier |
|---|---|
| pump3 | 101 |
| tankfarm4 | 305 |
| 44 | 44 |
| is-located-in | 35 |
| has-flow | 38 |

Resource table 240 enables forward and reverse lookups to be performed.

An additional point is that the property has-flow is an example of a functional object property, which is defined as a property for there is at most one distinct individual, or object, connected to the subject at a time. In practical terms this means that the expression has-flow is such that pump3 can only have one flow value at a time. For convenience, assertions which have functional object properties are sometimes referred to as functional assertions and assertions with properties that are not function, i.e. that have nonfunctional properties, may be referred to as nonfunctional assertions. In certain embodiments, the structure and operation of snapshot table 254, history table 252 and snapshot cache 238 are optimized to take advantage of certain inherent properties of functional assertions, as discussed hereinbelow.

FIG. 3B illustrate two additional types of OWL 2 assertions. The assertion IsA(:pump3 :pump) indicates that the individual pump3 is a member of the class of pumps. Next, the assertion SubClassOf(:pump :equipment) indicates a relationship between two different classes; in this case stating that the class of pumps forms a subclass of the class of equipment. Such assertions are used to define membership of individuals or entities in classes and between classes.

Adding the Temporal Component to Axioms Using a Bitemporal Database Representation As previously discussed, RTAP server 230 stores axioms in knowledge base 250. To provide support for time-based applications, such as industrial control applications, that have a temporal component, RTAP extends the OWL API to support bitemporal data.

To do this, RTAP adds time information to assertions that may be used to determine over what period of time an assertion is valid and adds a transaction start time to all axioms to indicate when the axiom was committed to, or stored in, knowledge base 250. Essentially, for certain assertions, including data property assertions and object property assertions, two elements of time-based information are added, a valid start time and a transaction start time. These time elements are commonly used by bitemporal databases Prior art bitemporal databases are typically SQL databases that include temporal extensions and queries are performed using a temporal version of the Structured Query Language which has been implemented in the TSQL2 and SQL:2011 query languages.

Bitemporal databases enable time-based queries by storing a valid start time, a valid end time, a transaction start time, and a transaction end time with each assertion. With this data it is possible to determine over which time period a particular fact is true or false. In the example presented in FIG. 3A, this makes it possible, for example, to query, "for how long was the flow of pump3 equal to 42".

However, as will be discussed subsequently, the table structure of conventional bitemporal databases, which include four temporal elements with each assertion (valid start time, valid end time, transaction start time, transaction end time), makes it difficult to achieve high performance when writing large volumes of facts to disk. Bitemporal databases also account for now-relative time intervals. For a given assertion that is currently valid, its now-relative time interval is represented by the time period extending from its valid start time to the current transaction start time. Queries in a bitemporal database can exploit the dynamic nature of now-relative intervals, i.e. that they continually grow as time moves forward. For example, by accounting for now-relative intervals a query can ask "for how long has the flow of pump3 been 42".

RTAP system 200 and RTAP server 230 introduce a technique for implementing a real-time knowledge base that stores assertions in an ontology representation, such as OWL, with temporal information that is added to the basic SPO assertion received from agents 210. Essentially, RTAP's storage fabric 232 acts as a bitemporal knowledge base that natively stores and processes OWL axioms and is optimized to provide high performance in environments that have a high volume of assertions.

In one embodiment, the subject invention generates an extended representation of S-P-O assertions to incorporate temporal information. In one embodiment, this extended representation is an ordered list of six values to incorporate temporal information reflect the time element, referred to herein as an assertion tuple, a sextuple, or a sextuple index key. The values are: S—subject, P—Predicate, O—Object, VT—Valid start time, TT—Transaction start time, C—certainty, or S-P-O-V-T-C for short.

Transaction start time is the time obtained from scheduler 236 at the start of a cycle during which an axiom or assertion is processed. The transaction start time represents the time at which the axiom assertion is committed to knowledge base 250. Valid start time can be any time in the past or future associated at which time an assertion or axiom becomes valid or true. This may occur prior to or after the transaction start time. For example, due to latency in receiving or processing a message the valid start time may be 1 millisecond earlier than the transaction start time when the fact is processed by the assertion pipeline. In many cases the valid start time and the transaction start time are identical. In the simple examples presented herein only one value of time is used for each assertion, the transaction start time.

The resulting fusion of an ontology representation of knowledge, a triple store and a bitemporal database approach enables a consistent set of facts that include temporal information to be stored in a knowledge base.

In one embodiment, the value of C (certainty) is a probabilistic or fuzzy value between 0 and 1; in another embodiment it is a BOOLEAN value of 1 for 100% certain or true and 0 for 0% certain or false. In other embodiments, C may take on different values. In the examples given herein the BOOLEAN values of 1 and 0 are used Write Only Operation of Assertions by the Assertion Pipeline A key principal of the subject invention is that incoming assertions are appended to history table 252 and assertions stored in history table 254 are never removed or modified.

It may be appreciated that a single value for each of VT and TT are stored and not a valid time starting and ending time and a transaction time starting and ending time. Thus, two time values are stored for each assertion rather than four values as is done by prior art bitemporal databases.

Figure 4:
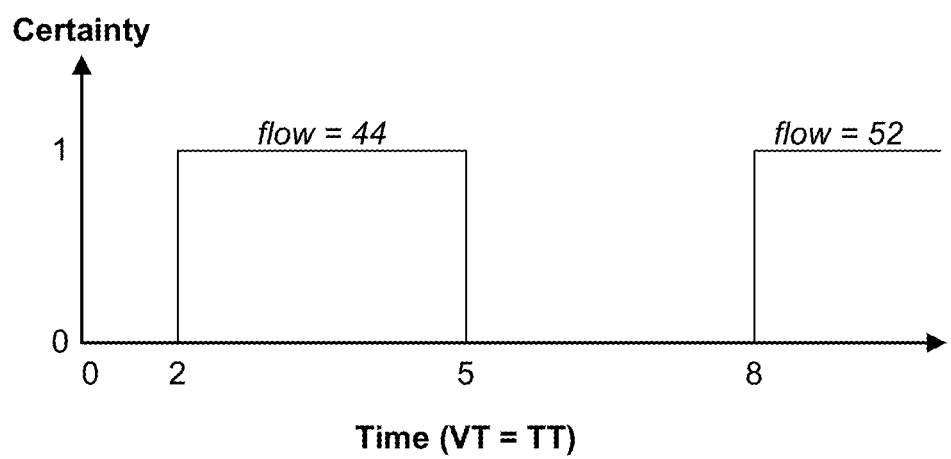
FIG. 4 illustrates an example of a sequence of assertions concerning the flow of water through a pump.

FIG. 4 illustrates an example of a sequence of assertions concerning the flow of water through a pump. In this example, a sequence of three messages are received from agents that report the flow of water through pump3 at different times. The first assertion indicates that pump3 has flow of 44 units/second starting at time 2. A prior art bitemporal database might store the assertion as indicated in Table 2, below:

TABLE 2

Prior Art Bitemporal Database Representation of An Assertion

| S | P | O | VT Start | VT End | TT Start | TT End |
|---|---|---|----------|--------|----------|--------|
| 101 | 38 | 44 | 2 | | 2 | |

Several seconds later, at time=5 a new assertion is received that pump flow now has a value of 52. In a prior art bitemporal database, the system reads the table and writes the value of VT end and TT end. Thus the prior art bitemporal database performs an initial write to the table without the VT End and TT End values, one read once the new assertion is received and a second write of the new row with the VT End and TT End values, thus a read followed by a write to a single row in the table. In addition, the prior art bitemporal database stores the new assertion values on disk in the second row in Table 3, below.

TABLE 3

Prior Art Bitemporal Database Representation of A Second Assertion

| S | P | O | VT Start | VT End | TT Start | TT End |
|---|---|---|----------|--------|----------|--------|
| 101 | 38 | 44 | 2 | 5 | 2 | 5 |
| 101 | 38 | 52 | 8 | | 5 | |

In contrast, the equivalent sequence of steps performed by storage fabric 232 when processing a newly received assertion are as follows: (1) storage fabric 232 generates an assertion tuple, or sextuple index key, with a Certainty value of 1, (2) locates and reads the values of a corresponding assertion in snapshot cache 238, i.e. an assertion with identical values of S and P but a different value of O, (3) it writes a retraction tuple, or retraction, with the same values as the cached assertion tuple except that C=0 and the transaction start time (TT) is set to the current transaction time to history table 252, yielding the top two rows of Table 4, below. Note that the first row was written at time TT=2 when the earlier assertion was processed. Finally, (4) storage fabric 232 writes the new assertion in the third row of history table 252, with C=1.

TABLE 4

RTAP Representation of Two Assertions

| S | P | O | VT | TT | C |
|---|---|---|----|----|---|
| 101 | 38 | 44 | 2 | 2 | 1 |
| 101 | 38 | 44 | 5 | 5 | 0 |
| 101 | 38 | 52 | 8 | 5 | 1 |

Note that this method is described in further detail below in reference to FIG. 6.

By comparison, to store an assertion with complete time interval information a prior art bitemporal database performs a read of the previously stored assertion with incomplete time interval information, followed by a write of two rows. In contrast, RTAP server 230 performs a cache read followed by two sequential writes, i.e. the retraction tuple followed by the assertion tuple. Thus, RTAP server 230 avoids reading from history table 252 or snapshot table 254, through the use of snapshot cache 238. In an environment when a stream of assertions are being received each second, for example in a power or water network, this approach yields substantially better performance.

The retraction tuple, with confidence 0, is known in the art as a retraction, i.e. a statement that indicates that the previous assertion is no longer true.

Caching of data allows for the starting and ending time to be written into assertions at the ending time, as will be subsequently discussed.

Thus, at every point RTAP server 230 optimizes so as to minimize or eliminate disk reads when writing assertions. This is because reads, i.e. disk seeks, are expensive or slow as compared to writing data sequentially to disk.

The tradeoff is that some queries require additional processing since a single stored assertion does not include the start and end time of a transaction. Thus, a start and end time must be computed, for example to answer a query such as for how long did pump3 have flow of 44 units. However, use of snapshot cache 238 minimizes this performance hit.

The RTAP Decision Cycle

RTAP operates on a real-time basis. Real-time means that the incoming flow of message data must be processed without falling behind and incurring a significant delay between when the data arrives and when it is processed. To keep up with a flow of incoming messages that must be written and processed, RTAP divides time into consecutive cycles.

Figure 5:
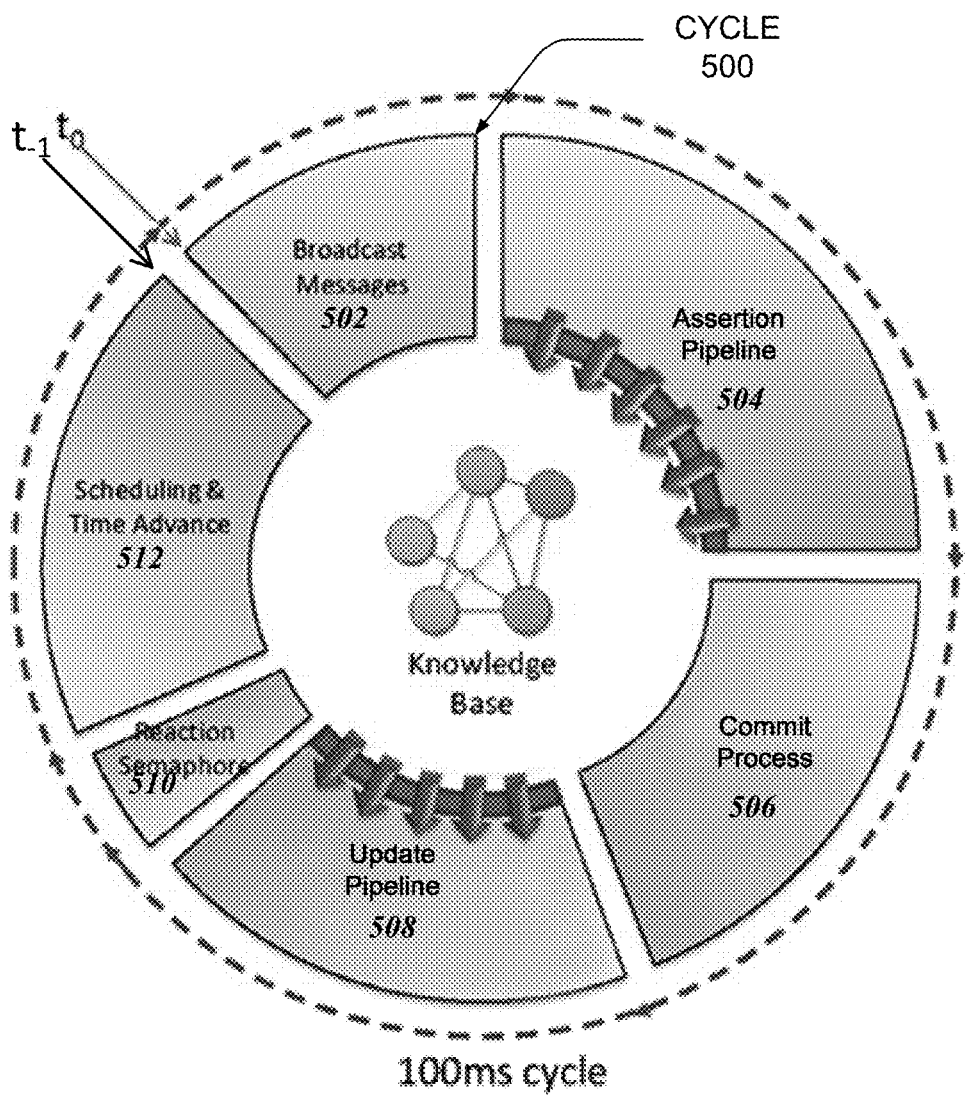
FIG. 5 illustrates the major processes related to assertion processing performed by the RTAP server during a cycle.

FIG. 5 illustrates the major processes related to assertion processing performed by RTAP server 230 during a cycle. The RTAP server also performs concurrent query processing. As illustrated, in one embodiment a cycle duration of 100 milliseconds is used but in other embodiments cycles may be longer or shorter.

During a decision cycle, RTAP server 230 processes a stream of OWL axioms. The stream is partitioned into separate sub-streams, with assertions being enqueued for asynchronous processing by a process referred to as assertion pipeline 504. In one embodiment, axioms other than assertions are directly processed as they are received, i.e. they are not queued. Direct processing of non-assertional axioms is suitable for many application scenarios in which the loading of these (non-assertional) axioms is typically constrained to the initial application deployment phase, for example when initially creating the hierarchical structure of an ontology. Generally, these axioms are seldom if ever retracted, so no bitemporal history is recorded for non-assertional axioms, i.e. axioms that are not assertions. No further discussion of the processing of non-assertional axioms in included herein.

A key goal of the RTAP design is that all agents that access the knowledge base see consistent views of data at all times during each decision cycle, this includes knowledge or data in knowledge base 250, snapshot cache 238, resource table 240, and data currently being processed. To achieve this, time is held at a value throughout the decision cycle, the value indicated as $t_0$ in FIG. 5. The time is updated from the scheduler at the end of the decision cycle. Thus, all axioms processed and stored during a decision cycle receive the same transaction start time value. However, for concurrent queries processed during a decision cycle, the maximum observed transaction start time is held at the value indicated as $t_{-1}$, i.e. the transaction start time of the prior decision cycle. This ensures that no query can see an inconsistent view of partially-completed assertion state during the current decision cycle. Thus, consistency is achieved when all agents that can access data maintained by RTAP server 230 uniformly see data as it existed at the end of the previous cycle.

A cycle start, indicated by $t_0$, is initiated by supervisor agent 234 based on the arrival of messages from agents 210 that include assertions to be processed. During an initial phase 502, agents broadcast messages that are received by RTAP server 230 and are placed in assertion pipeline command queue 242, essentially each assertion is added, in the form of an assertion command to be processed, to command queue 242.

Next, an assertion pipeline 504 processes each of the commands in command queue 242. Assertion pipeline 504 generates assertion tuples, and retraction tuples, writes them to the appropriate tables in knowledge base 250, and updates snapshot cache 238. Axioms can be processed in parallel by a mufti-processor or multi-core computer system.

For each assertion in command queue 242, storage fabric processor 232 creates an assertion tuple, i.e. sextuple (S, P, O, VT, TT, C), and writes the assertion tuple to knowledge base 250 and snapshot cache 238. For each entity, if the name of the entity appears in resource table 240 then the corresponding ID is used. If the name doesn't exist then a new entry is added to resource table 240 by (1) generating a unique identifier for the entity, (2) generating a universal resource indicator (URI) as required by the OWL language if necessary, and (3) adding a forward and a reverse element to resource table 240.

Once all axioms are processed, a commit process 506 is performed. Indices are generated, snapshot cache 238 is updated the transaction is committed to disk.

Next, an update pipeline 508 executes any predefined, repetitive queries, referred to as triggers or continuous queries.

Next, a process 510 signals a reaction semaphore is, which allows the RTAP scheduler to time-synchronize with external systems. In one embodiment this is used by RTAP to provide hardware-in-the-loop simulation.

Finally, a scheduling process 512 advances the transaction start time. Essentially, the current time provided by the scheduler is read and is used as the transaction start time for the next cycle.

History Table

Each assertion processed by assertion pipeline 504 is written to history table 252. History table 252 maintains a history of all assertions processed by RTAP server 230. History table 252 enables agents, or any external process, to look at time series data and to ask historical questions. Any query that involves data values other than current data values that are available in snapshot cache 254 and or snapshot table 238 use data from history table 252.

In one embodiment, history table 252 is implemented as two tables, a forward history table and a reverse history table. The forward history table is used for queries where given a value for S and a value for P, the querying process, referred to as a query agent, wants to find O values. The reverse history table is used for queries where the query agent provides values for P and O and wants to find S values.

As a simple example, if an assertion is of the form A has-sensor B, where A is the class of pumps, i.e. A=pump 241, from FIG. 3B, and B is an individual from a class of sensors, the SPO values are S=pump 241, P=has-sensor, O can take on various sensor values.

In the forward case, a query such as (S=pump 241, P=has-sensor, O=*) yields a table of all assertions in the forward history table for which Pump 241 has a sensor.

In the reverse case, a query such as (P=has-sensor, O=sensor5 (a particular type of sensor), *) yields a table of all assertions in which the subject has a sensor5, i.e. all the pieces of equipment in which sensor5 is used.

To optimize the forward and reverse history tables, the forward table is laid out in column order P-S-O-V-T-C and the reverse table is laid out in column order P-O-S-V-T-C where each value is a key and is therefore searchable. It may be appreciated by one skilled in the art that P is the first element since most queries typically state a particular type of property. It may be further appreciated by one skilled in the art that other types of layouts for history tables may be used without departing from the scope and spirit of the subject invention.

Snapshot Cache and Snapshot Table

The term snapshot is used to refer to the current assertion values, i.e. assertion values that have not been superseded and reflect the current state of RTAP system 200. A snapshot of an assertion may be found in snapshot cache 238 and is always found in snapshot table 254. Snapshot cache 238, is a size limited in-memory subset of snapshot table 254, which stores assertions that have been previously processed and written to snapshot table 254. As previously discussed, in one embodiment an assertion is represented as a sextuple. Snapshot cache 238 enables storage fabric 232 to process incoming assertions faster by eliminating the need to read assertions from snapshot table 254, which is stored on disk. Thus, rather than read current assertion values from disk, storage fabric 232 reads them from snapshot cache 238, which is maintained in memory and is thus faster to read and access than snapshot table 254. When no cache value is obtained from snapshot table 254 for a new assertion, performance is further improved because the new assertion can be written without additional processing since it has not been previously asserted.

For each subject, referred to as a Now Relative Individual (NRI) for purposes of the cache, each edge or predicate associated with this subject, referred to as a now relative edge (NRE), is stored in snapshot cache 238..

When an assertion is processed by the assertion pipeline, if a SP value is not in the cache then it is retrieved from snapshot table 254 and added to snapshot cache 238 for subsequent processing. Note that assertion pipeline 504 is able to determine that no such disk read is needed when the subject's integer identifier is known to have been allocated in the current commit cycle.

Queries to snapshot cache 238 and snapshot table 254 result in those assertions that match the submitted key values being returned. In one embodiment, snapshot cache 238 and snapshot table 254 are each divided into two tables, one for assertions with functional properties and one for assertions with nonfunctional properties. For assertions with functional properties, where there is at most one O value for a given value of S and P, a table structure in which S, P serve as the key values, as illustrated in Table 5A, below yields the best results.

TABLE 5A

Example Snapshot Table for Functional Assertions

| Key | | Values | | | |
|---|---|---|---|---|---|
| S | P | O | TT | VT | C |
| 101 | 35 | 44 | 2 | 2 | 1 |

In this example, when a new assertion with values S=101 and P=35 is processed then the value is overwritten with the 0 value from the new assertion and new VT, TT, and C values are generated to produce an updated sextuple that is written to snapshot cache 238 and snapshot table 254. Thus, the most current values of O, VT, TT, C are maintained in snapshot cache 238 and snapshot table 254.

In this embodiment, a second table is used to store assertions with nonfunctional properties, where there may be multiple O values for a given S, P combination. For nonfunctional assertions, S-P-O serve as the key values, as illustrated in Table 5B, below, since it is necessary to retrieve the specific S-P-O assertion when querying.

TABLE 5B

Example Snapshot Table for Nonfunctional Assertions

| Key | | | Values | | |
|---|---|---|---|---|---|
| S | P | O | TT | VT | C |
| 101 | 35 | 44 | 2 | 2 | 1 |

Generally, optimizing the key values for assertions with functional properties so as to speed up query processing can yield a significant performance benefit since operationally, with respect to applications such as industrial automation, the vast majority of data requests, which come in the form of queries, are for the current O value of SPO functional assertions.

Operation of the Assertion Pipeline

Figure 6:
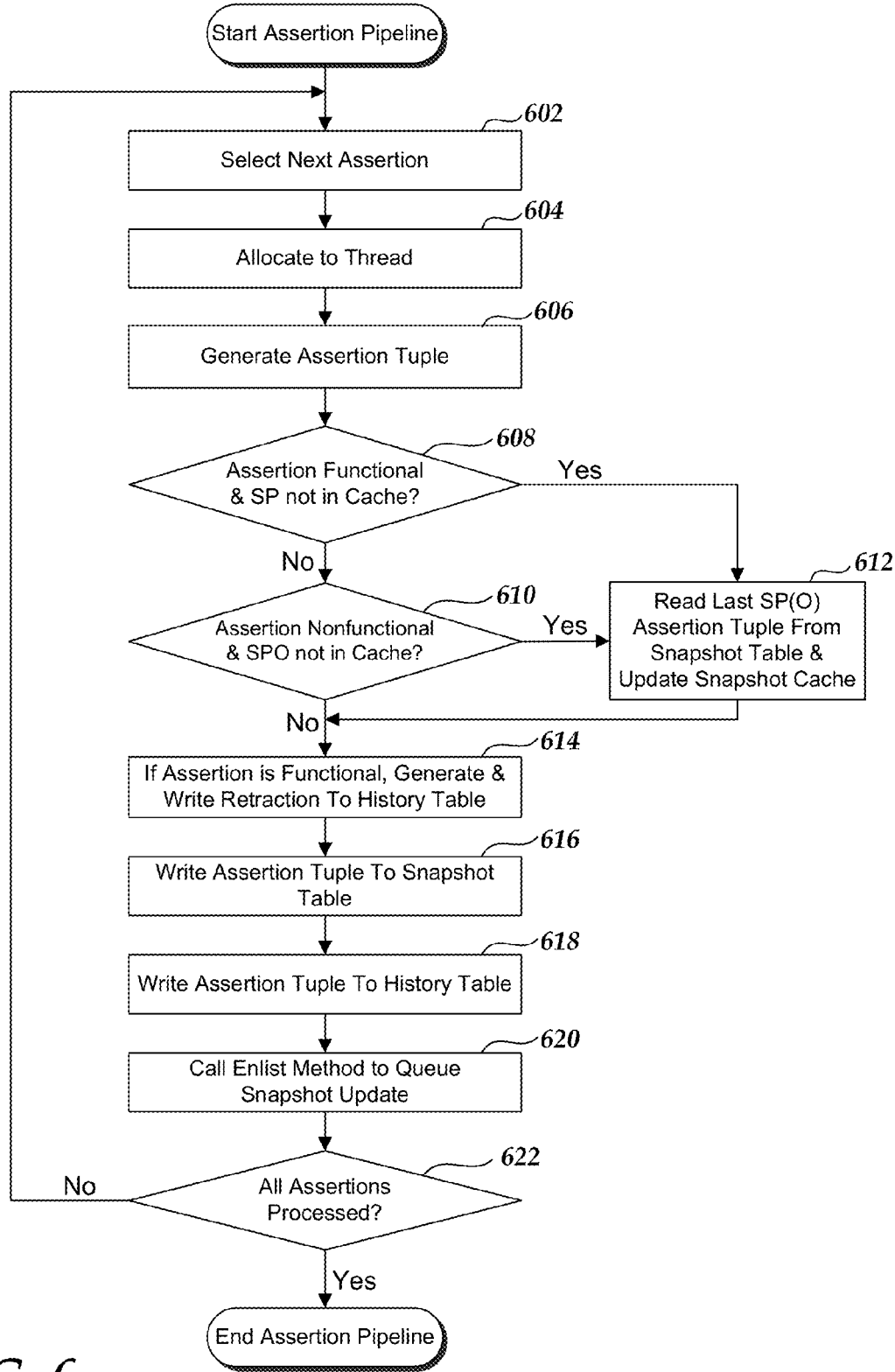
FIG. 6 is a flow diagram that illustrates one embodiment of the processing steps performed by an assertion pipeline, which processes incoming assertions.
Figure 7:
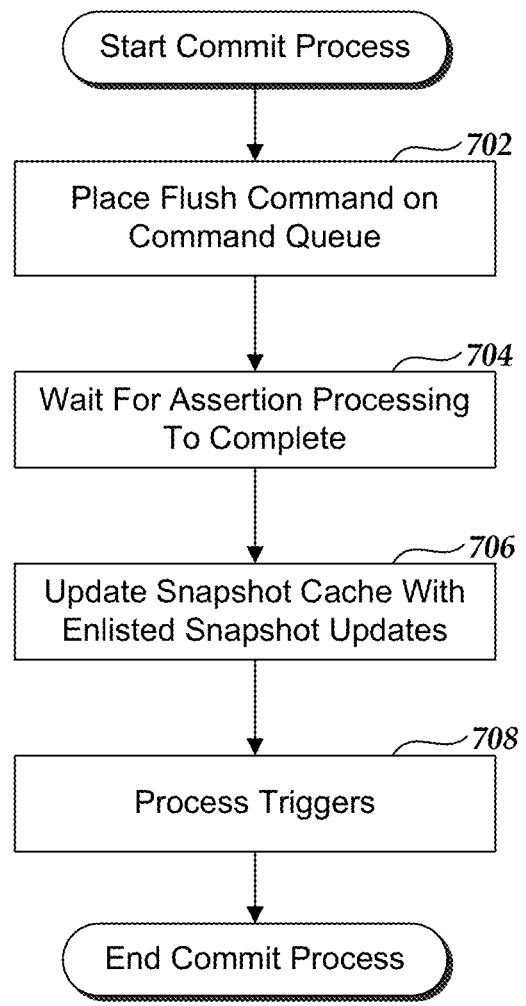
FIG. 7 is a flow diagram that illustrates one embodiment of the processing steps performed by a commit process, that executes after incoming assertions are processed by the assertion pipeline.

FIGS. 6 and 7 are flow diagrams that illustrate one embodiment of the processing steps performed by assertion pipeline 504 and commit process 506, which process incoming axioms, write them to knowledge base 250, create indices and update snapshot cache 238. Assertion pipeline 504 defers certain tasks, which are subsequently performed by commit process 506; for this reason the two processes are closely interrelated and are both considered in detail hereinbelow.

In certain embodiments, a multi-threaded framework, such as MICROSOFT's .NET, is used by assertion pipeline 504, to process assertions in the assertion pipeline command queue.

Assertion pipeline 504 is optimized to enable parallel processing using a multi-core processor, i.e. a computing component with two or more independent central processing units (called cores). In one target environment, industrial automation, most commands, or axioms, that are received from agents 210 are assertions. Thus, assertion pipeline 504 is designed to process these incoming assertions by writing them to disk and performing the necessary housekeeping on a real-time basis, i.e. at a rate that keeps up with the incoming message flow. To achieve this, individual assertions are handled in parallel, i.e. RTAP server 230 allocates assertions individually for processing by the next available core. This level of performance is achieved in part by using a shared cache, i.e. snapshot cache 238, that is available to each of the cores. In addition, performance is further enhanced by dividing the assertion pipeline into hierarchical stages, in which each stage is capable of concurrent processing. The top-level stage is a command processor that interprets commands and routes them to substages that operate on specific command types. The top-level stage is also able to orchestrate activity across all substages, e.g. to suspend input of new commands until all substages have responded to a synchronization request.

It should be noted that during execution of assertion pipeline 504 queries may be received. These queries may concurrently read snapshot cache 238. Only when a query references an assertion that is not currently present in snapshot cache 238 does the query need to interact with the assertion pipeline processing. For example if the query is of the form S=S1, P=P1, * and there is no assertion in snapshot cache 238 such that S=S1, P=P1 then there is no appropriate assertion in the cache with which to answer the query. In this case, the specific query evaluation must be momentarily suspended, while a request is made to assertion pipeline 504 to obtain the appropriate snapshot value from snapshot table 254 and add it to snapshot cache 238. To accomplish this, a command is placed in command queue 242 which when executed causes assertion to pause while the query is executed. Then, either the snapshot value is read from disk, or if such an assertion is already in command queue 242 it is first processed, which results in the assertion being added to snapshot cache 238 and to snaphot table 252. This step ensures that asynchronous queries always result in a consistent view of the data.

Referring now to FIG. 6, at step 602 assertion pipeline 504 selects the next assertion command queue 242 to process. In one embodiment, commands in command queue 242 are processed using a first-in-first-out (FIFO) discipline; in other embodiments other priority disciplines maybe used.

At step 604 the selected assertion is allocated to an available thread for processing. Since most incoming axioms are assertions, in practical terms this means that processing of incoming assertions can be performed in parallel.

At step 606 a sextuple index key, or assertion tuple, is generated in which $TT=t_0$, the time at the beginning of the current cycle and Certainty=1. The SPO values assigned to the assertion tuple are taken from the incoming assertion. In one embodiment, if no VT value is present in the incoming assertion then VT=TT. It may be appreciated by one skilled in the art that while the assertion tuple is embodied herein as a sextuple value, in other embodiments it may be represented as a tuple of a different order or may be represented quite differently without departing from the scope and spirit of the present invention.

At step 608 a determination is made as to whether the selected assertion is functional and if there is not already an assertion with the same SP portion, e.g. S=S1 and P=P1, in snapshot cache 238. If so, processing flows to step 612. If not, then at step 610 an additional determination is made as to whether the selected assertion is nonfunctional and there is not a corresponding SPO value already in snapshot cache 238. If not, then processing flows to step 614.

If the answer to either of the two determinations is yes, then a determination is made that the selected assertion is not already in snapshot cache 238 and processing flows to step 612. At step 612 the most recently stored value of the selected assertion tuple is read from snapshot table 254. In one embodiment, as previously discussed, there are two snapshot tables, one for functional assertions and one for nonfunctional assertions. In this embodiment, if the selected assertion, with values S=S1, P=P1, is functional then if an assertion exists in the snapshot table 254 for functional assertions with values S=S1, P=P1, then it is read and added to snapshot cache 238. Similarly, in this embodiment, if the selected assertion, with values S=S1', P=P1, O=O1, is nonfunctional then if an assertion exists in the snapshot table 254 for nonfunctional assertions with values S=S1', P=P1, O=O1 it is read and added to snapshot cache 238. This step would typically occur when rebuilding snapshot cache 238 and has the effect of bringing snapshot cache 238 up-to-date with respect to the selected assertion.

At step 614, if the selected assertion is functional, i.e. has a functional property, then a retraction tuple, i.e. a retraction, is generated and written to history table 252. Retraction is performed by writing the values of the cached sextuple but with a certainty value of 0 and a transaction start time equal to the time of the current cycle, $t_0$, to history table 252. In the embodiment, where there are two history tables, a forward history table, with columns P-S-O-V-T-C and a reverse history table, with columns P-O-S-V-T-C, the sextuple with updated transaction start time and certainty value of 0 is written, in various embodiments, to the either or both of the forward or reverse history tables. This has the effect of adding an assertion that signifies the end of the valid period of the previous assertion for which the certainty value was 1.

At step 616 the assertion tuple, i.e. the snapshot value of the selected assertion, is written to snapshot table 254. In the embodiment with two snapshot tables, the snapshot value is written to the appropriate table based whether or not the assertion is functional.

At step 618 the assertion tuple is written to the history table. In the embodiment where the history table comprises a forward and a reverse history table, the assertion tuple is written to each history table, i.e. two sextuples are appended to the existing forward and reverse history tables in knowledge base 250.

At step 620 an enlist method or process queues the assertion tuple, or snapshot update, to be written back to the cache as part of commit processing after assertion pipeline 504 completes processing. This distributes the writing in time and across the processing. Also, by writing these updates as part of assertion pipeline 504 the snapshot updates are only written to snapshot cache 238 at the end of the cycle, by commit process 506, to ensure consistency with respect to queries for snapshot values that occur before commit completion. In addition, the enlistment method registers assertions that are to be broadcast as event triggers by commit process 506.

Finally, at step 622 a determination is made as to whether all assertions have been processed by assertion pipeline 504. If not then processing returns to step 602 and the next assertion in command queue 242 is processed. If so the method terminates.

Commit Processing

FIG. 7 provides a flow diagram for an exemplary embodiment of the processing steps performed by commit process 506, which executes after incoming assertions are processed by the assertion pipeline. Commit process 506 is initiated at step 702 when a commit command, named Flush, is issued by supervisor agent 234 after the assertion pipeline 504 finishes processing all assertions in command queue 242.

At step 704 commit process 506 waits for assertion processing to complete; i.e. for all threads operating in assertion pipeline substages to finish processing commands in command queue 242 and to perform cache maintenance as required. During this step and all subsequent steps in the commit process, i.e. steps 704-708, the command processor is blocked from processing any further commands until step 708 completes and the Flush command is removed from assertion pipeline 504.

At step 706 commit process 506 processes enlisted snapshot updates. The snapshot updates, which correspond to the assertions processed by assertion pipleline 504 during the current cycle are written to snapshot cache 238. Since the pipeline is blocking all other commands during this step, the snapshot update is atomic and consistent with respect to any queries that may have been issued asynchronously during the commit process.

Next, at step 708 commit process 506 processes any triggers, which are also referred to as continuous queries. A continuous query is a query of the form [S1,P1,O1] that is performed each cycle. When an SPO arrives with values such that S=S1, P=P1, O=O1 then a notification is sent to a designated process.

Figure 8:
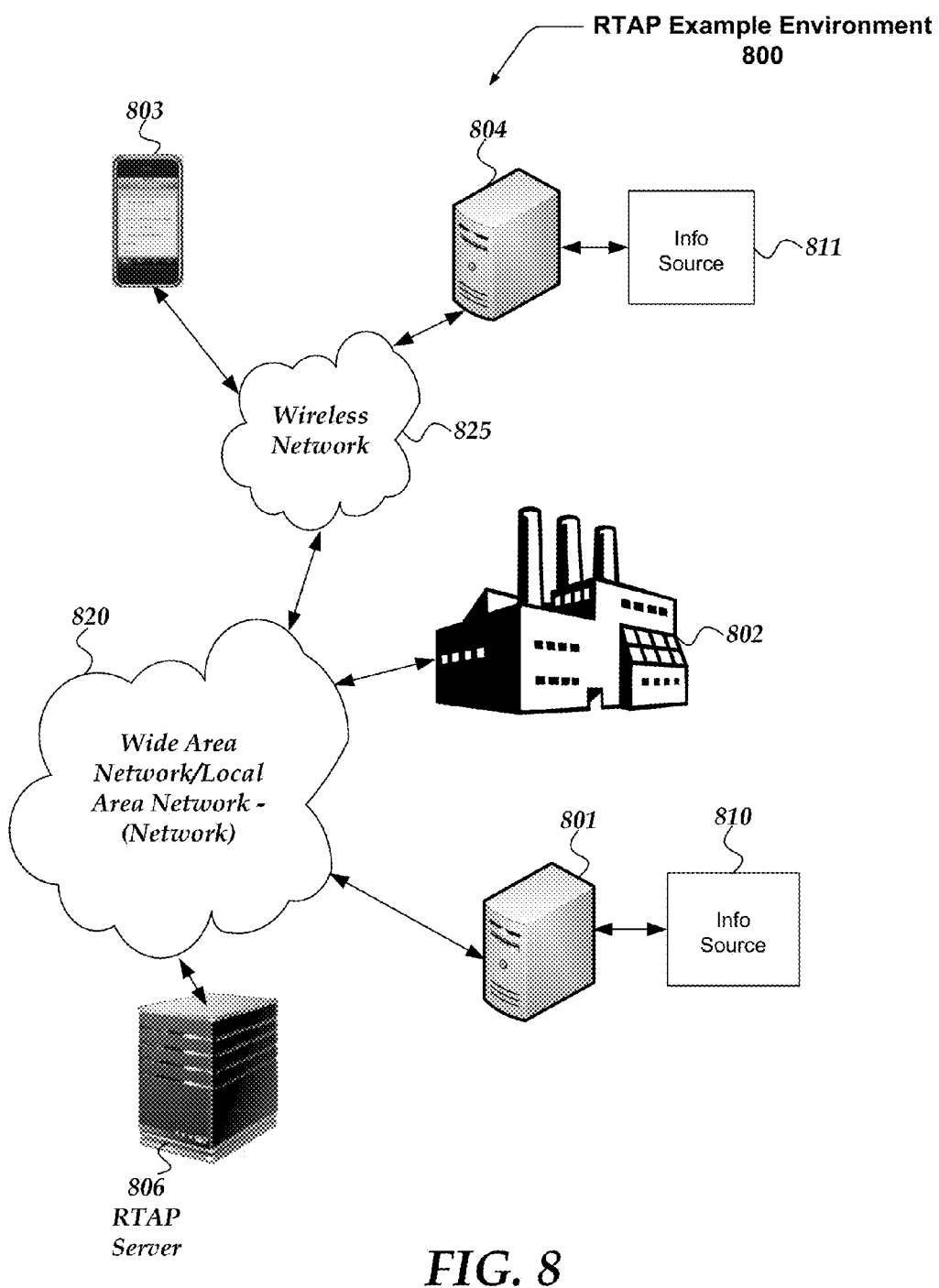
FIG. 8 is a system diagram that shows components of one exemplary environment in which the invention may be practiced.

FIG. 8 is system diagram that illustrates components of one exemplary environment in which the invention may be practiced. Not all of the components may be required to practice the invention, and variations in the arrangement and types of the components may be made without departing from the spirit or scope of the invention. As depicted, example environment 800 of FIG. 8 includes wide area network ("WAN")/ local area network ("LAN")—(network) 820, wireless network 825, agents 801-804, RTAP server 806, and information sources 810-811.

Agents 801-804 are embodiments of agent 210 which may connect to either or both of wireless network 825 or network 820. Wireless network 825, network 820, and the combination of wireless network 825 and network 820 are embodiments of network 220. RTAP server 806 shows one embodiment, or implementation, of RTAP server 230.

Agents 801 and 804 are coupled, respectively, with information sources 810 and 811. In such embodiments, the agent receives a flow of information from the information source and provides messages across network 820 or the combination of network 820 and wireless network 825 to RTAP server 806. In other embodiments, represented by agents 802 and 803 the agent and information source are combined, i.e. the agent is integrated with the information source. In this case the integrated agent/information source provides messages across network 820 or the combination of network 820 and wireless network 825 to RTAP server 806. An information source, such as information sources 810-811 and integrated information sources 802-803, is the source of information that is provided by a respective agent to RTAP server 806 for processing.

Generally, agents 801-804 include any computing devices that are capable of receiving and sending messages over a network, such as network 820 or wireless network 825. Agents 801-804 include personal computers, multiprocessor systems, microprocessor-based or programmable electronics devices including consumer devices, mobile devices such as mobile telephones, smart phones, display pagers, tablet computers, handheld computers, laptop computers, wearable computers, custom computer devices or the like.

An Internet-enabled agent, such as agents 801-804, can communicate across the Web. It includes Internet communications capabilities and may send, receive and display text and data, including documents, graphics, multimedia, or the like, employing a network protocol such as Hypertext Transfer Protocol (HTTP) and/or wireless application protocol (WAP). It can receive and send messages, web pages, emails, or the like. Agents 801-804 may be capable of formatting messages and data using semantic web standards such as OWL, RDF and XML. In addition, they may be equipped to provide messages and data in the enhanced version of OWL described hereinabove.

Agents 801-804 may include client application programs that send and receive content to/from other computing devices. Examples of application programs include browsers, messaging and email clients and so forth. Agents 801-804 may be configured to include an application program that sends and receives messages to and from RTAP server 806. Agents 801-804 may also be configured to include other application programs.

Wireless network 825 is configured to couple agents 803-804 with network 820. Wireless network 825 may include any of a variety of wireless networks that provide a connection for agents 803-804. Such networks may include mesh networks, wireless LAN (WLAN) networks, cellular networks, or the like. Wireless network 825 may further include network devices such as gateways routers, or the like. In essence, wireless network 825 may include virtually any wireless communication device or mechanism by which enables information to travel between agents 803-804 and another computing device, network, or the like.

Network 820 is configured to couple RTAP server 806, and agents 701 with other computing devices, including through wireless network 825 to client devices 803-804. Network 820 may include the Internet in addition to local area networks (LANs), wide area networks (WANs), direct connections, combinations thereof or the like.

RTAP server 806 represents one or more network computing devices that are configured to receive and process messages from agents 801-804. Devices that may operate as RTAP server 806 include, but are not limited to personal computers, desktop computers, multiprocessor systems, microprocessor-based or programmable consumer electronics, network PCs, servers, network appliances, and the like. Typically, such devices include memory, data storage, a network adapter or transceiver and one or more CPUs.

Although RTAP server 806 is illustrated as a distinct network device, the invention is not so limited. For example, a plurality of network devices may be configured to perform the functions of RTAP server 806. One such configuration is a "server farm" that includes multiple server computers operating cooperatively, each performing some of RTAP server 806 server functions. One embodiment of the software modules executed by RTAP server 806 is described with reference to FIG. 2 above.

RTAP server 806 functions may also be provided by a cloud computing facility in which the services, features and functions ascribed herein to RTAP server 806 are delivered as a service over a network, such as the Internet, rather than by a specific server or cluster of servers.

RTAP server 806 is capable of running application programs ("applications"). Applications that may be run by RTAP server 806 include transcoders, database programs, customizable user programs, security applications, encryption programs, VPN programs, web servers, applications servers, account management systems, and so forth.

RTAP server 806 provides web services which include any of a variety of network services that are configured to provide content, including messages, over a network to another computing device. Thus, web services may include an application server, a web server, a messaging server, a File Transfer Protocol (FTP) server, a database server, a content server, or the like. Web services may provide the content including messages over the network using any of a variety of formats, including, but not limited to WAP, HDML, WML, SGML, HTML, XML, cHTML, xHTML, JSON, REST, SOAP or the like. Web services may also include server-side scripting languages such as PHP, Python, and Java servlets. Web services may also include the server side of the Ajax web development method that enables a server to asynchronously respond to Ajax requests.

RTAP server 806 includes a computer processor (CPU), computer memory and nonvolatile data storage for storing program code and data. Computer memory may include RAM, DRAM, ROM, PROM, EPROM and the like. Computer memory is suitable for holding a cache such as snaphot cache 238 described in conjunction with FIG. 2 above.

Data storage provided by RTAP server 806 may include virtually any mechanism usable for storing and managing data, including but not limited to a file, a folder, a document, a web page or an application, such as a database, digital media including digital images and digital video clips, and the like.

Data storage may further include a plurality of different data stores. For example, data storage may store a knowledge base such as knowledge base 250 described in conjunction with FIG. 2 above. Further, data storage may also include network storage or cloud storage in which the physical storage media, such as disk storage, is accessed across a network.

The above specification, examples, and data provide a complete description of the manufacture and use of the composition of the invention. Since many embodiments of the invention can be made without departing from the spirit and scope of the invention, the invention resides in the claims hereinafter appended.

What is claimed is:

1. A computer-implemented method for storing data in a knowledge base, comprising:
receiving a plurality of assertions wherein an assertion comprises a subject, a property and an object and wherein an assertion can have a functional property such that for a given subject and a given property the object has a single value at any time, and if a new assertion is received with the given subject and the given property and a different object value then the newly received assertion is valid and any previously received assertions are no longer valid;
maintaining a knowledge base that includes (1) a history table that stores previously received assertions, and (2) a snapshot table that stores currently valid assertions;
maintaining a snapshot cache in memory that stores a subset of the assertions in the snapshot table;
initiating a processing cycle, which is a period of time during which the received plurality of assertions is processed;
selecting an assertion for processing;
generating an assertion tuple that corresponds to the selected assertion, wherein the assertion tuple includes the subject, property and object of the selected assertion, a transaction time, which is the starting time of the cycle, and a certainty value set to true, indicating that the selected assertion is true as of the transaction time;
determining that the property of the selected assertion is functional;
writing a retraction tuple to the history table that indicates that a previous assertion with the same subject and property as the selected assertion is retracted, wherein the certainty value of the retraction tuple is set to false;
writing the assertion tuple to the snapshot table; and
writing the assertion tuple to the history table.

2. The method of claim 1 wherein the retraction tuple and the assertion tuple are sextuples that further comprise a valid time.

3. The method of claim 1 further comprising:
determining that there is no assertion tuple in the snapshot cache that corresponds to the selected assertion;
retrieving from the snapshot table the assertion tuple that corresponds to the selected assertion; and
updating the snapshot cache by adding the retrieved assertion tuple to it.

4. The method of claim 3 wherein determining that there is no assertion tuple in the snapshot cache that corresponds to the selected assertion comprises determining that there is no assertion tuple in the snapshot cache for which the subject and property values are identical to the subject and property values of the selected assertion.

5. The method of claim 1 further comprising updating the snapshot cache by:
identifying an assertion tuple in the snapshot cache that corresponds to the selected assertion; and
replacing the values of the identified assertion tuple in the snapshot cache with the values from the generated assertion tuple.

6. The method of claim 5 further comprising enlisting the assertion tuple by adding it to a list of assertion tuples to update the snapshot cache with.

7. The method of claim 5 wherein updating the snapshot cache is performed after each of the plurality of received assertions is processed.

8. The method of claim 1 wherein the history table comprises a forward history table and a reverse history table and the order of the first three columns of the forward history table are predicate, subject, object and the order of the first three columns of the reverse history table are predicate, object, subject.

9. The method of claim 1 wherein the snapshot table comprises a snapshot table for assertions that have a functional property and a snapshot table for assertions that have a nonfunctional property and the key values for the snapshot table for assertions that have a functional property are the subject and property and the key values for the snapshot table for assertions that have a nonfunctional property are the subject, property and object.

10. The method of claim 1 further comprising:
maintaining a list of triggers, wherein a trigger is a query that is performed once each cycle; and
processing each trigger in the list after all of the received plurality of assertions are processed.

11. A server computer, comprising:
a processor;
a network interface in communication with the processor;
a knowledge base that stores (1) a history table that includes previously received assertions, and (2) a snapshot table that stores currently valid assertions, wherein an assertion comprises a subject, a property and an object and wherein an assertion can have a functional property such that for a given subject and a given property the object has a single value at any time, and if a new assertion is received with the given subject and the given property and a different object value then the newly received assertion is valid and any previously received assertions are no longer valid
a memory in communication with the processor for storing instructions, which when executed by the processor, cause the server:
to receive a plurality of assertions;
to maintain a snapshot cache in memory that stores a subset of the assertions in the snapshot table;
to initiate a processing cycle, which is a period of time during which the received plurality of assertions is processed;
to select an assertion for processing;
to generate an assertion tuple that corresponds to the selected assertion, wherein the assertion tuple includes the subject, property and object of the selected assertion, a transaction time, which is the starting time of the cycle, and a certainty value set to true, indicating that the selected assertion is true as of the transaction time;
to determine that the property of the selected assertion is functional;
to write a retraction tuple to the history table that indicates that a previous assertion with the same subject and property as the selected assertion is retracted, wherein the certainty value of the retraction tuple is set to false;
to write the assertion tuple to the snapshot table; and
to write the assertion tuple to the history table.

12. The server computer of claim 11 wherein the retraction tuple and the assertion tuple are sextuples that further comprise a valid time.

13. The server computer of claim 11 wherein the instructions, when executed by the processor, further cause the server:
- to determine that there is no assertion tuple in the snapshot cache that corresponds to the selected assertion;
- to retrieve from the snapshot table the assertion tuple that corresponds to the selected assertion; and
- to update the snapshot cache by adding the retrieved assertion tuple to it.

14. The server computer of claim 13 wherein determining that there is no assertion tuple in the snapshot cache that corresponds to the selected assertion comprises determining that there is no assertion tuple in the snapshot cache for which the subject and property values are identical to the subject and property values of the selected assertion.

15. The server computer of claim 11 wherein the instructions, when executed by the processor, further cause the server:
- to identify an assertion tuple in the snapshot cache that corresponds to the selected assertion; and
- to replace the values of the identified assertion tuple in the snapshot cache with the values from the generated assertion tuple.

16. The server computer of claim 15 further comprising enlisting the assertion tuple by adding it to a list of assertion tuples to update the snapshot cache with.

17. The server computer of claim 15 wherein updating the snapshot cache is performed after each of the plurality of received assertions is processed.

18. The server computer of claim 11 wherein the history table comprises a forward history table and a reverse history table and the order of the first three columns of the forward history table are predicate, subject, object and the order of the first three columns of the reverse history table are predicate, object, subject.

19. The server computer of claim 11 wherein the snapshot table comprises a snapshot table for assertions that have a functional property and a snapshot table for assertions that have a nonfunctional property and the key values for the snapshot table for assertions that have a functional property are the subject and property and the key values for the snapshot table for assertions that have a nonfunctional property are the subject, property and object.

20. The server computer of claim 11 wherein the instructions, when executed by the processor, further cause the server:
- to maintain a list of triggers, wherein a trigger is a query that is performed once each cycle; and
- to process each trigger in the list after all of the received plurality of assertions are processed.

* * * * *